United States Patent [19]

Lemieux et al.

[11] Patent Number: 4,638,686
[45] Date of Patent: Jan. 27, 1987

[54] TRANSAXLE FOR A VEHICLE DRIVELINE

[75] Inventors: George E. Lemieux, Livonia; Reginald T. Lewicki, Dearborn Heights; Julius A. Clauss, Birmingham, all of Mich.

[73] Assignee: Ford Motor Company, Dearborn, Mich.

[21] Appl. No.: 134,240

[22] Filed: Mar. 26, 1980

[51] Int. Cl.$^4$ .............................................. F16H 47/08
[52] U.S. Cl. ...................................... 74/688; 74/695; 74/761
[58] Field of Search ................. 74/760, 761, 681, 688, 74/694, 695, 606 R

[56] References Cited

U.S. PATENT DOCUMENTS

| | | | |
|---|---|---|---|
| 3,355,966 | 12/1967 | Boehm | 74/688 |
| 3,359,827 | 12/1967 | Chapman, Jr. et al. | 74/688 |
| 3,455,185 | 7/1969 | Ohno et al. | 74/688 |
| 3,505,905 | 4/1970 | Lepelletier | 74/688 |
| 3,614,902 | 10/1971 | Candellero | 74/695 |
| 3,916,727 | 11/1975 | Piret | 74/688 |
| 4,014,223 | 3/1977 | Pierce, Jr. | 74/688 |
| 4,056,986 | 11/1977 | Hobbs | 74/688 |
| 4,095,487 | 6/1978 | Cartwright et al. | 74/695 |
| 4,244,241 | 1/1981 | Treadwell | 74/695 |
| 4,271,721 | 6/1981 | Yamamori et al. | 74/695 |

Primary Examiner—Leslie A. Braun
Assistant Examiner—Joseph M. Rolnicki
Attorney, Agent, or Firm—Donald J. Harrington; Keith L. Zerschling

[57] ABSTRACT

An automatic transaxle for use in an automotive vehicle driveline including a compound planetary gearset, a hydrokinetic unit and a torque splitter gear unit that cooperate to define torque delivery paths from the vehicle engine to a driven shaft; the driven shaft being located between the hydrokinetic unit and the compound planetary gearing and the torque splitter gear unit being located within the housing for the hydrokinetic unit; and clutch-and-brake means for establishing and disestablishing each of the forward driving ratios and the reverse drive ratio, the clutch-and-brake means being arranged in a compact fashion within the housing for the compound planetary gearing to provide a minimum axial length of the assembly; the driven shaft being connected drivably to the vehicle traction wheels through a differential gearing mechanism; the hydrokinetic unit, the gearing and the differential mechanism being enclosed in a common cast housing.

1 Claim, 5 Drawing Figures

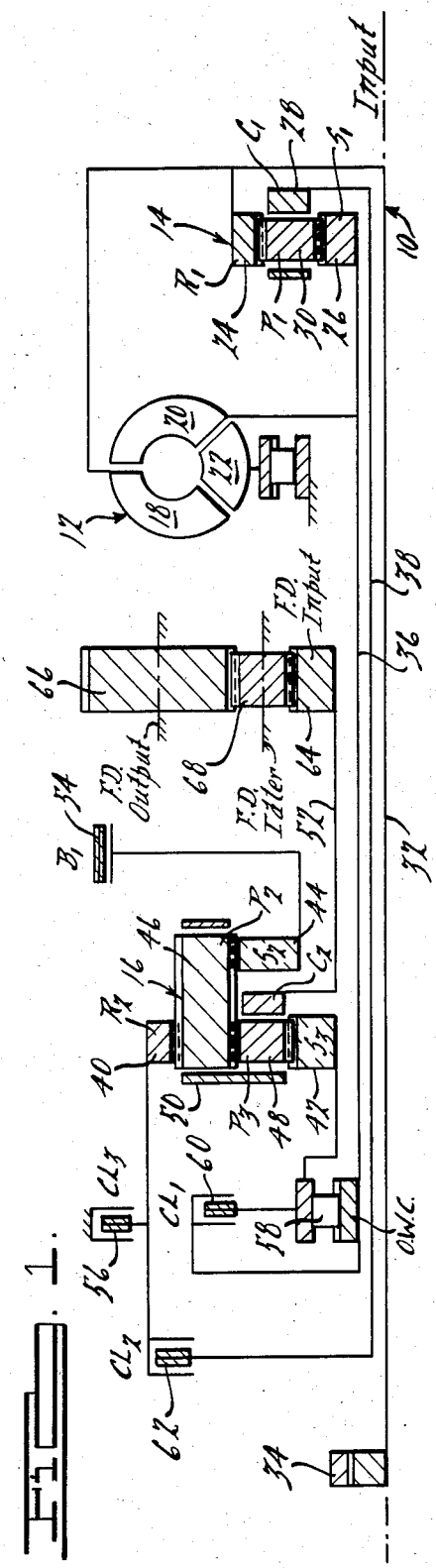

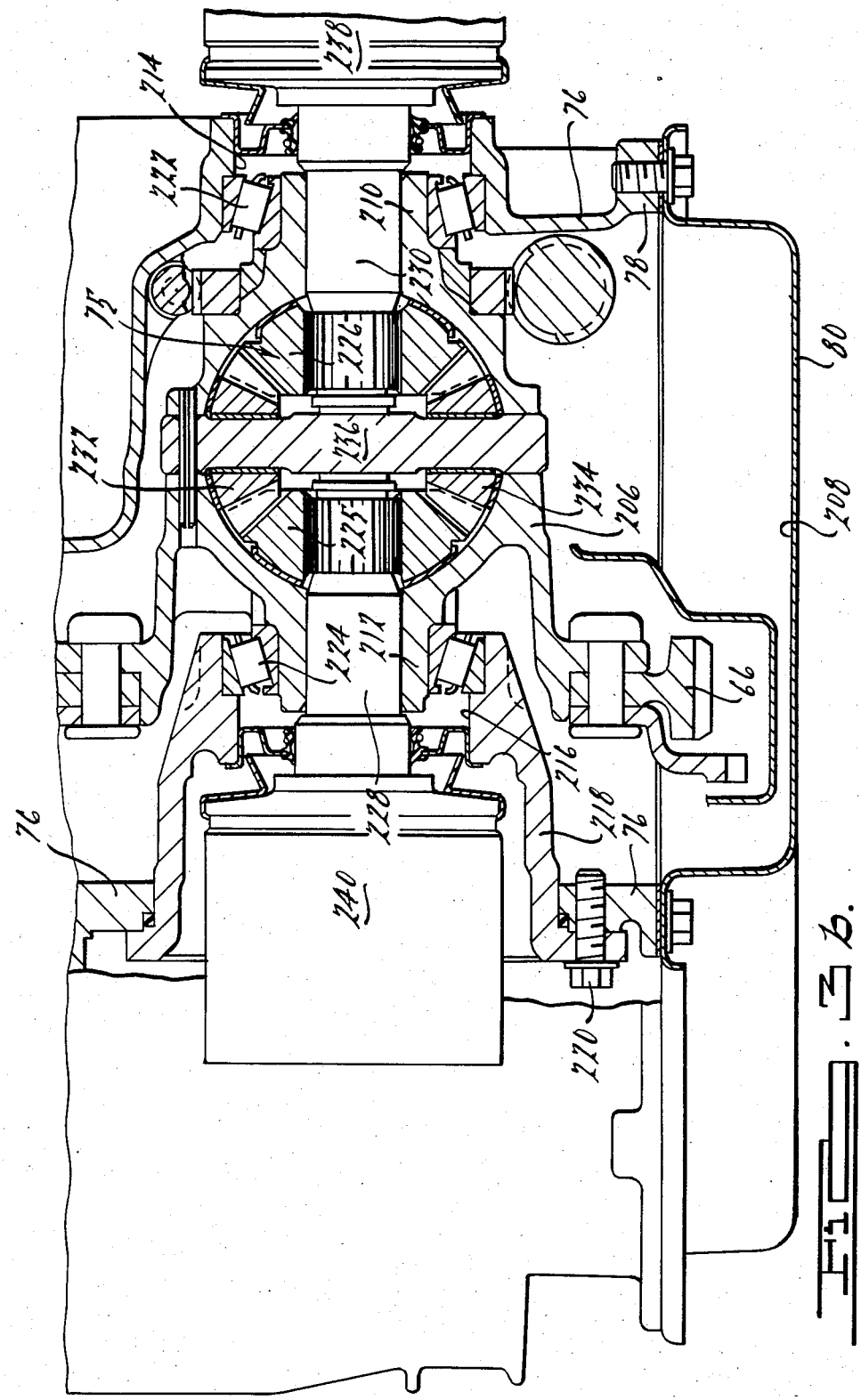

TRANSAXLE FOR A VEHICLE DRIVELINE

GENERAL DESCRIPTION OF THE INVENTION

Our invention comprises improvements in a transmission of the type shown in U.S. Pat. No. 4,014,223, which issued to Stanley L. Pierce, Jr. on Mar. 29, 1977. The Pierce, Jr. patent is assigned to the assignee of this invention.

The transmission disclosed in U.S. Pat. No. 4,014,223 is a so-called inline transmission wherein the power output shaft is coaxial with the input shaft. It is adapted especially for a rear wheel drive vehicle. It employs a split torque delivery in the third ratio whereby a portion of the torque is distributed from the engine to the driven shaft through a hydrokinetic torque converter and a larger portion, perhaps 66 per cent, is distributed mechanically through the gearing from the engine to the power output shaft. A similar torque split between the mechanical path and the hydrokinetic path occurs during operation in the high speed or fourth ratio although a larger percentage of the torque then is distributed mechanically.

The present invention, as in the case of the invention of U.S. Pat. No. 4,014,223, uses a simple planetary torque splitter gear unit; but it is located entirely within the housing for the torque converter. The torque splitter unit establishes a torque delivery path between the turbine and the impeller of the hydrokinetic unit on one hand and each of two torque input shafts for the gearing on the other hand.

The transaxle of the present invention is adapted for a front wheel drive vehicle and the output elements of the torque delivery paths are located between the hydrokinetic unit and the planetary gear unit to reduce the overall length of the transmission assembly. The output elements include a differential gearing mechanism that distributes torque from the output element of a compound planetary gear unit to each of two axle shafts for the traction wheels of the vehicle. Various attempts have been made in earlier construction known in the art to combine multiple ratio planetary gearing with a differential gear mechanism, an example being shown in U.S. Pat. No. 3,859,872. A torque splitter gear unit of the present invention, unlike the gearing of U.S. Pat. No. 3,859,872, is located within the converter housing. There is no split torque feature, furthermore, shown in U.S. Pat. Nos. 3,859,872. Russell 2,961,476 shows planetary gearing located within the torque converter housing for establishing plural torque delivery paths between an output shaft for the hydrokinetic unit and multiple bladed units for the hydrokinetic unit, but that gearing also lacks a torque splitter function as above described.

The location of the splitter unit and the arrangement of the torque output elements of the present invention are designed to provide a minimum axial length of the transmission assembly which permits a transverse disposition of the axis of the transmission with respect to the fore-and-aft centerline of the vehicle. A clutch and brake mechanism is used in combination with the main transmission gearing of the present invention and the friction elements of the clutches and brakes are arranged in a compact fashion to permit a minimum axial length of the housing, the latter being common to the gearing as well as the hydrokinetic unit.

BRIEF DESCRIPTION OF THE FIGURES OF THE DRAWINGS

FIG. 1 is a schematic representation of the overall transmission assembly that embodies the improvement of this invention.

FIG. 2 is a chart that shows the clutch and brake engagement and release pattern for the transmission mechanism of FIG. 1.

FIGS. 3A and 3B together show a cross-sectional assembly view of a preferred embodiment of the invention illustrated schematically in FIG. 1.

PARTICULAR DESCRIPTION OF THE INVENTION

Figure 3A:
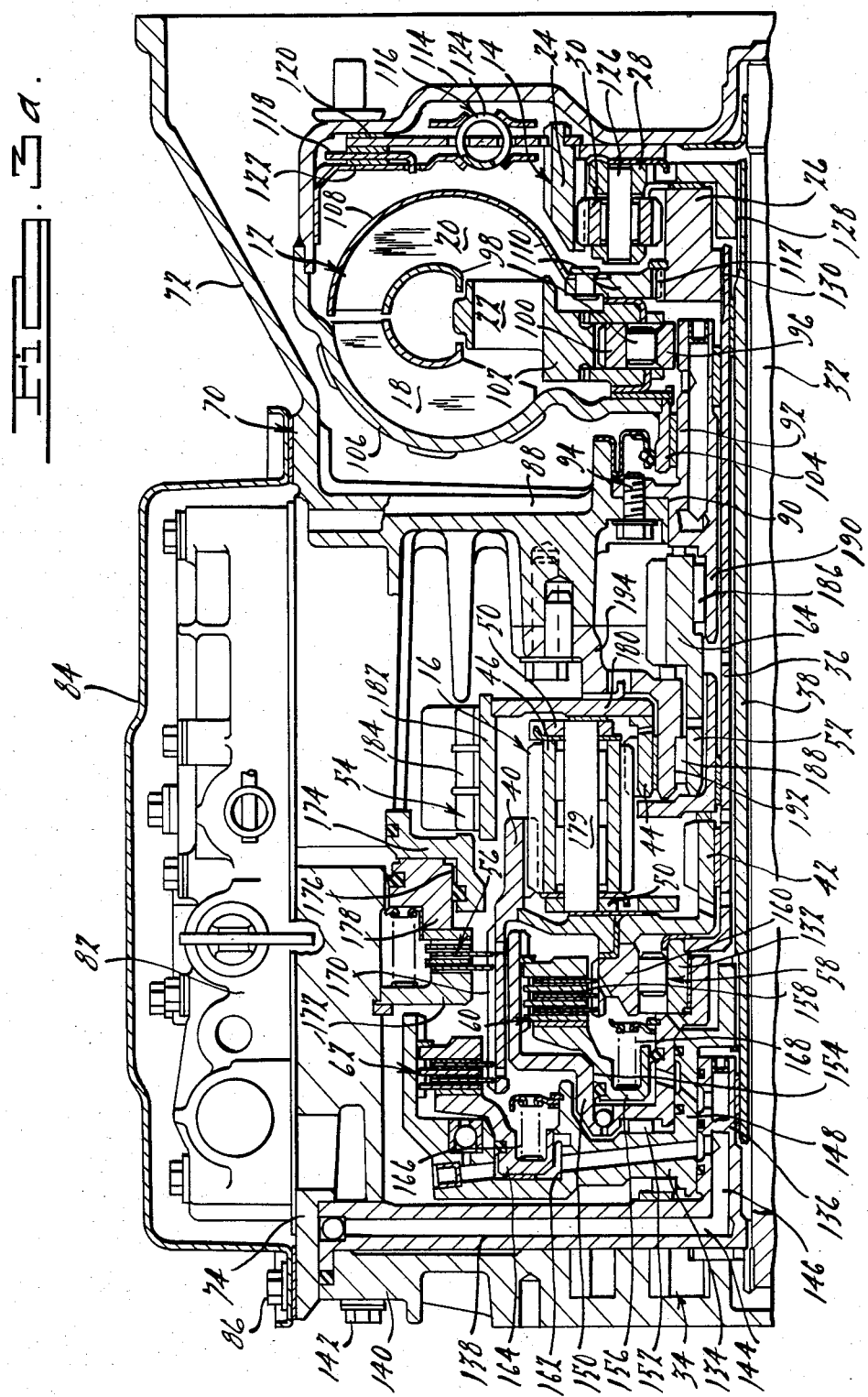

In FIG. 1 reference character 10 designates the transmission input shaft which may be the engine crankshaft of an internal combustion vehicle engine. Reference character 12 designates the hydrokinetic torque converter unit, reference character 14 designates a torque splitter unit located in the housing of the converter 12 and reference character 16 designates compound planetary gearing capable of establishing three forward driving ratios and a single reverse ratio upon selective engagement and release of friction clutches and brakes located on the side of the planetary gearing that is remote from the output elements of the gearing.

Converter unit 12 comprises a bladed impeller 18, a bladed turbine 20 and a bladed stator 22 arranged in the usual fashion in a toroidal circuit. Torque splitter gearing 14 includes a ring gear 24, a sun gear 26 and a carrier 28, the latter rotatably supporting pinions 30 which drivably engage the ring gear 24 and the sun gear 26.

Input shaft 10 is connected to impeller 18. A central shaft 32 extends through the gearing 16 and the converter unit 12 and serves as a driveshaft for a positive displacement pump 34 which is used to supply fluid pressure to the control system that will be described very generally with reference to FIG. 3. It is used to supply hydrokinetic oil also to the converter 12.

The gearing 16 is provided with a pair of torque input sleeve shafts 36 and 38, the shaft 38 being connected to the carrier 28 and the shaft 36 being connected to the sun gear 26.

Planetary gear unit 16 includes a ring gear 40, a pair of sun gear 42 and 44, a set of long planet pinions 46 and a set of short planet pinions 48. The pinions 46 and 48 are rotatably supported by common carrier 50. Planet pinions 46 engage ring gear 40 and planet pinions 48 engage sun gear 42. Pinions 46 and 48 also drivably engage each other.

The carrier 50 is connected drivably to sleeve shaft 52, which serves as a torque output shaft for the gearing 16.

A friction brake 54 is adapted to anchor selectively sun gear 54. A disc brake 56 is used to anchor the ring gear 40 to provide a reaction point during reverse drive operation. Brake 54, on the other hand, provides a reaction point during operation in the first and second forward underdrive ratios.

Sleeve shaft 36 delivers torque to sun gear 42 through an overrunning coupling 58 which may consist of rollers situated between an inner race and an outer race, the outer race being connected to sun gear 42. The races are connected together to bypass the coupling 58 by selectively engageable friction clutch 60, thereby permitting torque transfer between the shaft 36 and the sun gear 42 in either direction. A second friction clutch 62 is adapted to connect sleeve shaft 38 with ring gear 40 during operation in the second forward drive ratio and the third forward drive ratio.

The final drive gearing is schematically shown in FIG. 1 and identified by reference numerals 64, 66 and 68, Cthe latter being an idler between the final drive input gear 64 and the final drive output gear 66.

To establish the first forward underdrive ratio, brake 54 is applied thereby causing sun gear 44 to act as a reaction point. Full turbine torque is distributed from the converter 12 to the sun gear 42 through the sleeve shaft 36 and the overrunning coupling 58. The carrier 52 then is driven in low speed ratio. In a preferred embodiment the speed ratio during the first underdrive mode is 2.793, as indicated in FIG. 2.

Brake 54 remains applied during operation in the intermediate ratio and clutch 62 also is applied. Ring gear 40 now serves as an input element for the compound planetary gearing and the coupling 58 freewheels. The overall ratio that thus is established in a preferred embodiment of this invention is 1.605:1.

A ratio change to the third high speed ratio is achieved by releasing brake 54 and applying both clutches 60 and 62 simultaneously. This locks up the planetary gear unit to establish a 1:1 driving ratio through the gearing. The percentage of torque delivered to the output shaft hydrokinetically during operation in the high speed range is about 6.6 percent of the total torque delivered in a preferred embodiment of the invention. In contrast the percentage of torque distributed hydrokinetically during operation in the second speed ratio is about 38.1 percent in a preferred embodiment of the invention. All of the torque is distributed hydrokinetically, as above explained, in the lowest speed ratio.

FIG. 2 shows the clutch-and-brake engagement and release pattern. In FIG. 2 the symbol $B_1$ designates the brake 54, the symbol $CL_1$ designates the clutch 60, the symbol $CL_2$ designates the clutch 62, the symbol $CL_3$ designates the brake 56 and the symbol OWC designates the overrunning coupling 58. These symbols are used also in the schematic sketch of FIG. 1.

FIGS. 3A and 3B show a preferred embodiment of the transmission system illustrated schematically in FIG. 1. It includes a unitary transmission housing 70 which comprises a first housing portion 72 that encloses the hydrokinetic unit 12 and a second housing portion 74 that encloses the compound planetary gearing and the associated clutches and brakes.

Part of the housing 70 encloses a differential gear mechanism illustrated generally at 75. That housing portion is designated in FIG. 3B by reference character 76. The lower side of the housing portion 76 is provided with an opening 78 that permits assembly of the differential gearing 75. Opening 78 is closed by a oil pan 80 which serves as an oil reservoir for the control system and the gearing, the control system being located as shown at 82 at the upper side of the transmission housing portion 74. The control system includes a casting that encloses the various control elements that establish and disestablish sequential operation of the clutches and brakes. It is enclosed by a cover plate 84 which is bolted to the top of the housing portion 74, as indicated at 86. An end wall 88 of housing portion 72 has an opening 90 that receives stator support sleeve shaft 92 which is bolted to wall 88 at 94. The sleeve shaft 92 supports also inner race 96 of an overrunning coupling that has coupling rollers 98 and a cammed outer race 100. The overrunning coupling is positioned in hub 102 of stator 22.

Impeller 20 includes a hub 104 for an impeller housing 106 which encloses turbine 20.

The turbine 20 includes blades that are secured to an outer turbine shroud 108, the hub 110 of the shroud 108 being splined as shown at 112 to sun gear 26 of the torque splitter gear unit 14.

A side wall 114 of the converter housing is connected to the driveshaft of the engine through a driveplate, not shown. The forward wall 14 is drivably connected through a friction and spring damper assembly 116 to the ring gear 24 of the torque splitter gear unit 14.

Damper assembly 116 includes friction disc 118 which cooperates with drive plates 120 and 122 connected resiliently together by damper springs 124. A damper assembly of the type designated at 116 is illustrated in U.S. Pat. No. 4,143,561. It comprises the springs 124 mounted so that their axes extend tangentially, the spring 124 being located in openings formed in the driveplates 120 and 122. Frictional resistance to movement of the driveplate 122 relative to the driveplate 120 is resisted by friction forces established by friction material located on the radial outward extremities thereof. This friction material may be located between the plate 120 and the inner surface of the housing wall 114, between the disc 118 and the driveplate 120 and between the disc 118 and the driveplate 122. The frictional forces in combination with the spring forces produce a so-called Coloumb effect.

Driveplate 120 is splined or keyed at its inner margin to ring gear 24. Pinions 30 are mounted on pinion shafts 126 which form a part of the carrier 28. Turbine 20 is connected at its hub 110 to the sun gear 26 and the carrier is splined at 128 to the sleeve shaft 38, which forms one of two torque input shafts for the gearing 16. The sun gear 26 is splined at 130 to the sleeve shaft 36 which forms a second torque input shaft for the gearing 16.

The left end of sleeve shaft 36 is keyed or otherwise positively connected to the inner race 132 of the overrunning coupling 58.

A clutch cylinder housing 134 is journalled on stationary sleeve shaft 136 which is connected to end wall 138 for the housing portion 74. Pump housing 140, together with the wall 138, is bolted as shown at 142 to the housing portion 74. Pump housing 140 forms a part of positive displacment pump 34.

Wall 138 is internally ported, as shown at 144, to provide a clutch feed passage which communicates with pressure passages 146 in the sleeve shaft 136.

Housing 134 is provided with a hub 148 which is journalled on the sleeve 136 and which provides a bearing support for clutch housing 150 for the clutch 60. A radial needle thrust bearing 152 is disposed between adjacent walls of the housing 134 and the housing 150.

Clutch cylinder 154 receives therein an annular piston 156, the outer margin of the piston 156 being adapted to engage the multiple disc pack 158 for the clutch 60. Alternate discs of the clutch disc assembly 158 are splined to the outer portion of the piston 150 and the other discs that register with them are internally splined to outer race 160 of the overrunning coupling 158. Race 160 is joined integrally to the sun gear 42.

Clutch housing 150, as previously mentioned, is journalled at its hub on clutch housing 134. Housing 134 defines an annular cylinder 162 within which is received an annular piston 164. A clutch return spring 166, which is anchored on the housing 134, urges the piston 164 in a left hand direction to disengage the clutch 62. Fluid pressure is admitted to the cylinder working chamber for the clutch 62 through internal passages formed in the housing 134, which communicate with the passages 146 in the sleeve 136. Similarly, clutch return spring 168, which is anchored on the housing 150, urges the piston 156 in a left hand direction to disengage the clutch 60. Fluid pressure is admitted to the working chamber defined by the cylinder 151 through the internal passages in the housing 134 and in the sleeve 136.

When the working chamber for the clutch 62 is pressurized, the outer margin for the piston 164 frictionally engages the friction discs of the clutch 62. Alternate discs of the clutch 62 are splined externally to the outer portion of the housing 134. Alternate friction discs of the clutch 62 are internally splined to an externally splined drum 170, which is formed integrally with the ring gear 40. Internally splined discs for the disc brake 56 are connected drivably to the external splines of the drum 170. A brake reaction ring 172 is secured to the housing portion 74. A brake cylinder for the brake 56 is partly defined by cylinder ring 174, which also is secured to the housing portion 74. The annular cylinder 176, which is defined in part by the ring 174, receives annular piston 178 which is adapted to engage the discs of the brake 56 to lock the ring gear 40 to the housing portion 74, thus providing a torque reaction point for the transmission system during reverse drive operation.

The pinions 46 of the planetary gear unit 16 are journalled by needle bearings on pinion shafts 179 which form a part of the compound carrier described previously and designated by reference character 50.

Sun gear 44 is bolted or otherwise joined to brake plate 180, which is secured at its periphery to brake drum 182. Brake band 184 surrounds the drum 182 and it may be applied and released by a fluid pressure operated servo, not shown in FIG. 3, thereby establishing a reaction point for the gear system during operation in the low ratio and in the intermediate ratio.

Output gear 64 is journalled at 186 and 188 on support sleeves 190 and 192, respectively. Sleeve 190 forms a part of the stator support sleeve 92 and sleeve 192 is formed on support plate 194 which is bolted to the inner wall 88 of the housing portion 72. Plate 194 and the wall 88 are formed with aligned bearing shaft openings 196 and 198, respectively, which receive idler shaft 200. This shaft rotatably supports the idler gear 68 by means of tapered roller thrust bearings 202 and 204.

Figure 3C:
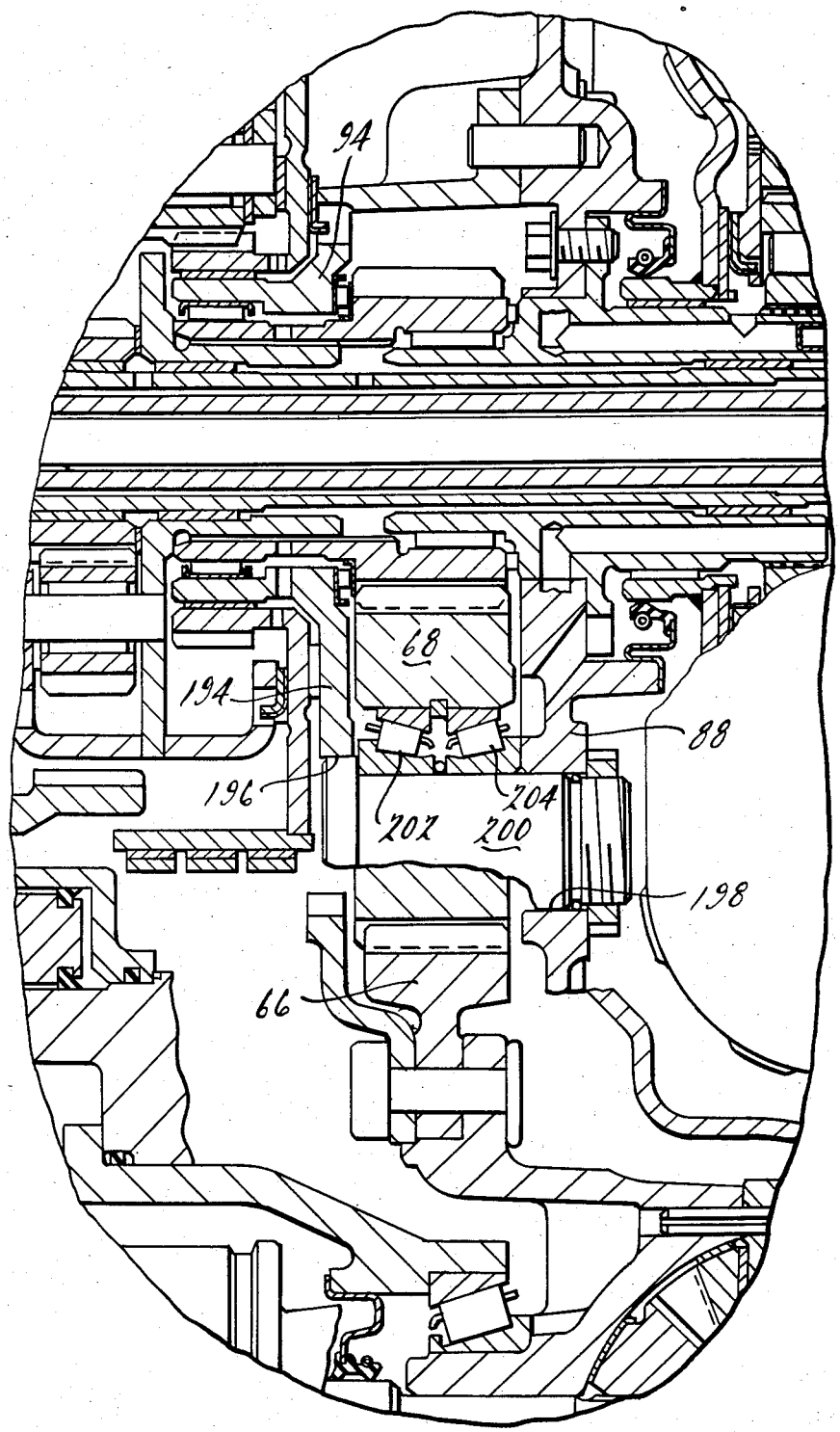
FIG. 3C is an enlarged cross-sectional view of a portion of the final drive gearing of the assembly of FIGS. 3A and 3B taken on a plane that is different than the plane of FIGS. 3A and 3B.

The output gear 66 is carried by differential carrier housing 206 as shown in FIG. 3. The carrier housing may be assembled by inserting therethrough opening 78 formed in the lower portion of the housing portion 76. Opening 76 is closed by oil pan 208.

The ends 210 and 212 of the differential carrier housing 206 are journalled in openings 214 and 216, respectively. Opening 214 is formed in an extension of the housing portion 76 and opening 216 is formed in a bearing support 218, which is bolted as shown at 220 within an opening 222 formed in the lower part of the housing portion 76. Roller thrust bearings 222 and 224 are provided for rotatably supporting the differential housing 206.

Differential side gears 225 and 226 are rotatably mounted within the housing 206 and they are splined, respectively, to output shafts 228 and 230. The side gears are beveled and they engage bevel pinions 232 and 234. The beveled pinions 232 and 234 are rotatably mounted on pinion shaft 236, which is supported at each end in openings formed in the differential carrier housing 206. A universal joint generally shown at 238 connects the shaft 230 to the driveshaft for the vehicle traction wheels and a corresponding universal joint 240 connects the other shaft 228 to the other driveshaft for the other traction wheels of the vehicle.

Having described a preferred embodiment of the invention, what we claim and desire to secure by U.S. Letters Patent is:

1. A transaxle for delivering torque from a driving member to a pair of driven members comprising a compound planetary gear unit, a hydrokinetic unit, a differential gear unit and a planetary gear torque splitter unit, the hydrokinetic unit and the planetary gear unit being assembled on a first axis;

a transaxle housing having a first housing portion enclosing said hydrokinetic unit and said torque splitter unit and having an opening at one side of said first housing portion whereby said hydrokinetic unit and said torque splitter unit may be assembled therethrough;

a second housing portion enclosing said compound planetary gear unit and having an opening at the side of said second housing portion opposite to said one side whereby said planetary gear unit may be assembled therethrough;

a housing wall adapted to close the opening in said second housing portion following assembly of said planetary gear unit;

a third housing portion enclosing said differential gear unit and having an opening in the lower side of said third housing portion whereby said differential gear unit may be assembled therethrough;

an oil pan covering the opening in said third housing portion;

said third housing portion being situated with respect to the axis of said hydrokinetic unit between said first and second housing portions and laterally offset therefrom;

said torque splitter unit having a torque input element and two torque output elements;

said hydrokinetic unit having an impeller connected to said torque input element and a turbine connected to one of said torque output elements;

a pair of concentric torque delivery shafts, one torque delivery shaft being connected to one of said torque output elements and the other being connected to the other torque output element;

said compound planetary gear unit having first and second sun gears, first and second planet gear sets mounted on a common carrier and engaging each other, said first sun gear engaging said first planet gear set and said second sun gear engaging said second planet gear set, and a ring gear engaging said first planet gear set;

a final drive input gear connected to said common carrier and a final drive output gear connected to an input side of said differential gear unit;

first brake means for selectively braking said first sun gear during low and intermediate drive operation;

first clutch means for connecting said one torque delivery shaft to said second sun gear;

second clutch means for connecting said other torque delivery shaft to said ring gear during intermediate and high ratio operation;

second brake means for selectively braking said ring gear during reverse drive operation;

both clutch means being applied during high ratio operation, said first clutch means being located in said second housing portion radially inward of said second clutch means on the side of said compound planetary gear unit remote from said hydrokinetic unit, said final drive gears being located between said hydrokinetic unit and said compound planetary gear unit;

said first clutch means comprising an overrunning coupling and a selectively engageable friction clutch in parallel relationship with respect to said overrunning coupling;

said first clutch means comprising also an input member located radially inward of an output member of said second clutch means on the side of said final drive gears remote from said hydrokinetic unit, said ring gear being connected to said output member of said second clutch means, an output member of said first clutch means being connected to said first sun gear, said final drive gears being connected drivably by a final drive idler gear;

said differential gear unit having a carrier housing, a ring gear on said carrier housing engaging said final drive output gear, separate output side gears of said differential gear unit being connected respectively to each of said driven members, said hydrokinetic unit having an impeller connected to said driving member;

said transaxle housing comprising a single-piece unitary casting in which said first, second and third housing portions are separately defined;

said first and second housing portions being separated by a bearing support wall that forms a part of said unitary casting;

the upper side of said second housing portion being adapted for supporting thereon a control valve assembly.

* * * * *